Nov. 20, 1923. 1,474,911
C. R. PRATT ET AL
CABLE TENSION EQUALIZING DEVICE
Filed April 6, 1921 3 Sheets-Sheet 1
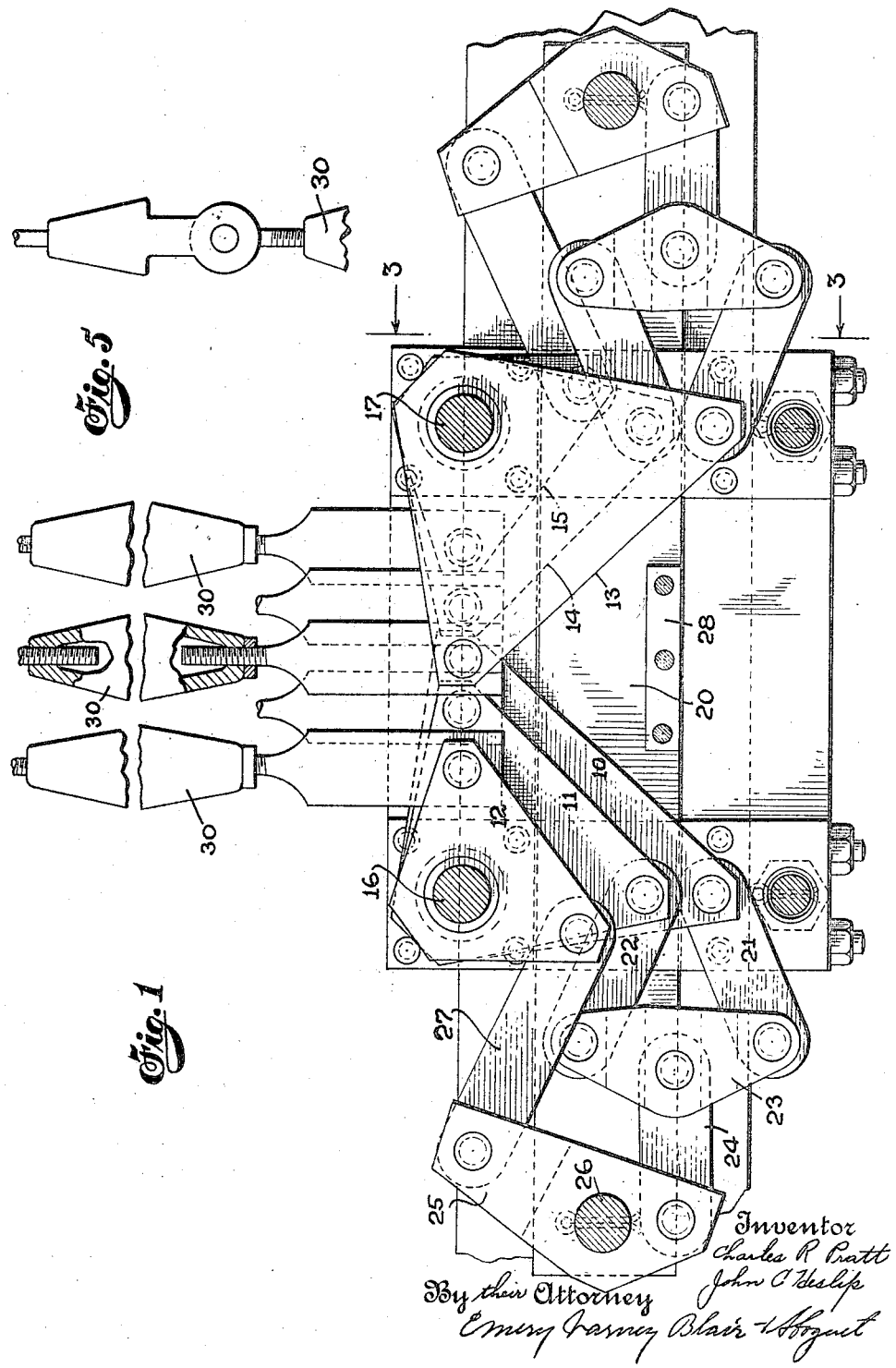

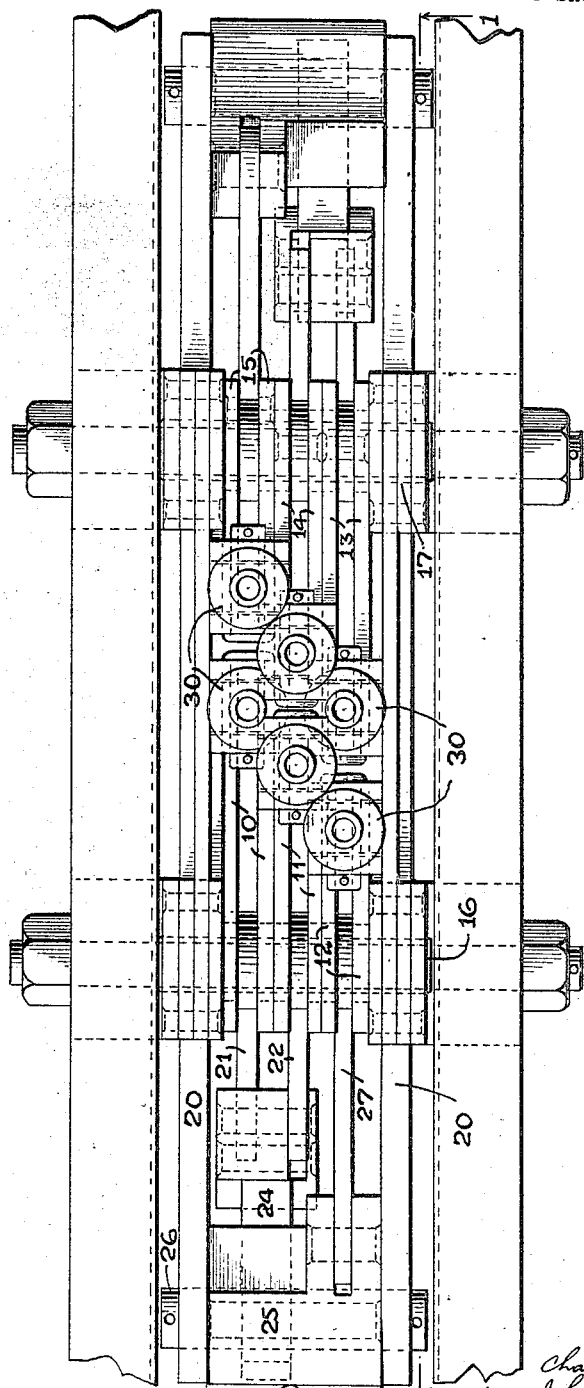

Nov. 20, 1923.

C. R. PRATT ET AL 1,474,911

CABLE TENSION EQUALIZING DEVICE

Filed April 6, 1921.

Inventor
Charles R Pratt
John C Heslip
By their Attorney
Emery Booney Blair & Hoguet Patented Nov. 20, 1923.

1,474,911

UNITED STATES PATENT OFFICE.

CHARLES R. PRATT, OF MONTCLAIR, NEW JERSEY, AND JOHN C. HESLIP, OF KANSAS CITY, MISSOURI; SAID HESLIP ASSIGNOR TO SAID PRATT.

CABLE-TENSION-EQUALIZING DEVICE.

Application filed April 6, 1921. Serial No. 459,132.

*To all whom it may concern:*

Be it known that we, CHARLES R. PRATT, a citizen of the United States, and a resident of Montclair, county of Essex, and State of New Jersey, and JOHN C. HESLIP, a citizen of the United States, and a resident of Kansas City, county of Jackson, State of Missouri, have invented an Improvement in Cable-Tension-Equalizing Devices, of which the following is a specification.

The present invention relates to a cable tension equalizing device adapted for use in connection with a plurality of cables attached to the same load.

The object of the invention is to provide an improved apparatus whereby the tension on several load carrying cables may be maintained substantially uniform under the varying conditions of operation. The invention is conceived to be most applicable to elevator cable equalizing mechanism and for convenience of disclosure will be explained solely in that connection, although obviously the invention is applicable to equalizing apparatus used in other relations.

In order that the load of an elevator may be properly distributed it is necessary to provide means operative to equalize the tension of the several supporting cables under the varying conditions of operation. When a plurality of cables are driven by frictional contact with the grooves of a driving sheave there is a tendency for some of the cables to creep relative to the others thereby causing the driving strain to be unevenly distributed unless equalizing means is provided. For example, during the travel of the car from the top of the shaft to the bottom, if the cables are directly connected to the car a substantial slack may develop between the car and driving sheave in one or more of the cables. This creeping may be due, for instance, to the fact that some of the cables engage more deeply in the grooves of the driving sheave on account of slight differences in the diameters of the cables or in the depths of the grooves.

The variations in stress on the several cables which develop during operation is objectionable for two reasons, first, the load of the car or counterweight is unevenly distributed and unduly stresses some of the cables and, second, the driving stress is unevenly distributed and not only causes excessive stresses on some of the cables but causes a slipping of some of the cables in the sheave grooves causing wear of both cables and sheave.

Certain restrictions obtain in the matter of mechanism which may in practice be employed to afford the desired equalization to remedy the above noted difficulties. The space between the top of the car in its highest position and the top of the elevator shaft must ordinarily be made as low as possible for economy of space, thus limiting the height of equalizing devices connecting the cables and car. Also, it is desirable, if not essential, that the cable connections be positioned relatively close together because the elevator driving equipment is more conveniently arranged with the supporting cables close together. These considerations apply also to the connections between the cables and counterweights.

For the purposes of illustration a particular embodiment of the invention will be described. The manner in which the several problems presented are met will be obvious from the description which should be read in connection with the accompanying drawings forming part hereof.

In the drawings,

Figure 1 is a sectional view taken on the line 1—1 of Figure 2 of a draft head constructed in accordance with the present invention adapted to be attached to the top of an elevator car;

Figure 2 is a top plan view of the same;

Figure 5 is a view showing the connection between the cables and the turnbuckles.

Figure 4:
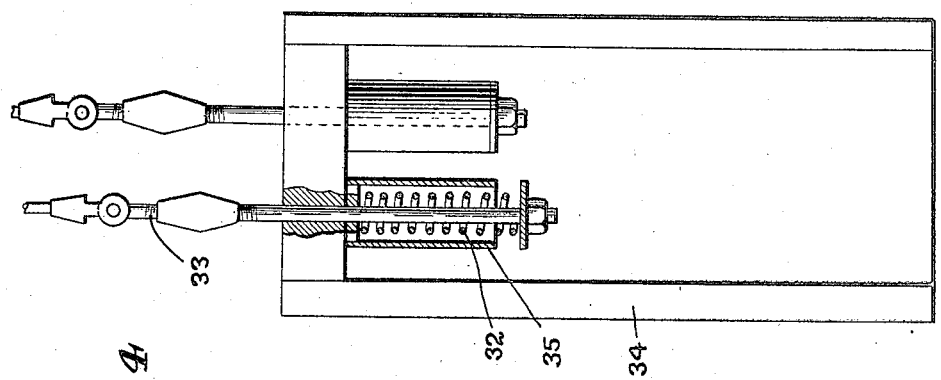
Figure 4 is a view partly in section of the counterweight.
Figure 3:
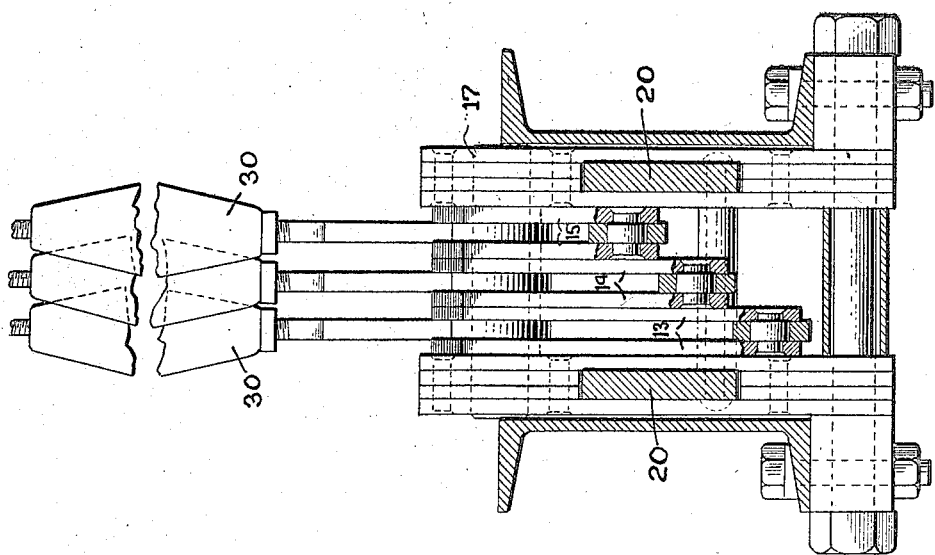
Figure 3 is a sectional view taken on the line 3—3 of Figure 1.

The construction shown for the purposes of illustration comprises a draft head in which are mounted a plurality of levers arranged to have cable ends attached thereto and means connecting said levers to cause the pulls of the several cables to act in opposition to each other. As shown, bell-crank levers 10 to 15 inclusive are arranged in groups on parallel pivot pins 16, 17 with the cable attaching arms of one group extending toward those of the other group. The arms thus extend toward a common center to make possible a close grouping of the cable connections. The pivot pins 16, 17 constitute a part of the draft head which is arranged to be suitably secured to the top of the car.

A floating member 20, shown as a frame slidably mounted in the draft head, is connected at one end to the levers of one group and at the other end to the levers of the other group so as to be urged in opposite directions thereby. The levers thus act in opposition to each other and so long as the total tension of one group is equal to the total tension of the other group no movement of the floating member occurs. A stretching of one or more cables of a group is, however, taken up by a shifting of the floating member, as will be obvious.

The levers of each group are connected to the floating member through equalizing means. The connections for both groups are similar. One set only will be described. Levers 10, 11 are connected by links 21, 22 to an equal armed floating lever or equalizing bar 23. This lever is centrally pivoted to a link 24 carried by the short arm of a two to one lever or equalizing bar 25 pivoted at 26 on the floating member 20. The lever 12 is connected by a link 27 to the longer arm of the lever 25. We prefer to provide means, as for example a stop 28, on the floating member to limit the movement thereof.

The horizontal arms of levers 10 to 15 may be, as shown, of different lengths to provide a staggered arrangement of the cable connections. This introduces no inequality of the forces transmitted if, as shown, the vertical arms are in each case of suitably proportioned length.

In use the several cables ordinarily stretch unevenly. We prefer therefore to provide in combination with the equalizing arrangement suitable adjusting devices for taking up the slack as occasion may require. We have shown turnbuckles 30 for this purpose arranged as a part of the connection between the horizontal lever arms and the cables.

Ordinarily it is not sufficient to provide equalizing devices at one end only of the cables for the reason that this does not prevent the development of inequalities in tension of the cables between the driving sheave and the other end of the cables.

If positively acting equalizing devices such as that above described are provided at both ends of the cables, the conditions with respect to the difficulties above discussed are improved but there is a tendency for some of the cables to work toward the car and for others to work toward the counterweight. It is desirable therefore to make the arrangement self-rectifying; that is to say, to make provision for causing the cables to work toward a central position in which all cables are even. In the illustrated arrangement we provide equalizing arrangements at both ends of the cables and make provision for automatic self-rectifying by including in one of the equalizing devices springs which tend to make the cable ends even. The self-rectifying equalizing device may, if desired, consist solely of springs without any equalizing lever mechanism combined therewith. Such an arrangement is shown in the construction illustrated.

The spring equalizing arrangement is preferably connected at the counterweight end of the cables, as shown, for the reason that the tension of the cables on this side of the driving sheave is a function of the weight of the counterweight and substantially constant whereas the tension of the cables between the driving sheave and the car varies with the load. For obvious reasons spring equalizing devices operate better under the substantially constant load.

Any desired number of counterweights may be employed, the size of each depending upon the number. In the illustrated structure one weight is employed and all cables are connected thereto.

A spring 32 is interposed between each cable end 33 and the counterweight 34. Preferably a limiting device 35 is arranged to limit the compression of the spring. The springs 32 are so designed that within the expectable limits of variation in the cable tensions a sufficient proportion of the load of the counterweight will be carried by the more slack cables to insure sufficient traction of the drive sheave and to avoid unsafe loading of the most taut cables. This arrangement is self-rectifying in that there is a tendency for the slack of the less taut cables to be taken up in operation as follows: While the counterweight 34 is being lifted from its lowermost position to its uppermost position the greater tension of the more taut (shorter) cables tends to pull such cables deeper into the sheave groove causing them to work on a smaller diameter thereby drawing less length of cable over the sheave. Also, the greater tension of the more taut cables tends to stretch them and this also tends, in effect, to equalize the lengths.

The described arrangement is merely illustrative. As will be obvious to those skilled in the art, many modifications may be made without departing from the spirit of the invention as defined in the subjoined claims.

We claim as our invention:

1. An equalizing device for draft rigging comprising levers pivoted in opposite groups having arms extending toward a common center for attachment to draft cables, a floating member movable horizontally and connections between each group of levers and said floating member so arranged that the pull of the cables of one group acts in opposition to the pull of those of the other group.

2. An equalizing device for equalizing the pull of cables for draft rigging comprising parallel pivot pins, a plurality of levers on each pivot pin, each lever being arranged for attachment of a supporting cable, a floating member, means including links and equalizing levers arranged to transmit equal tensions from the levers of one group to the floating member and similar means arranged to transmit equal tensions from the levers of another group to the floating member in the opposite direction.

3. An equalizing device for connecting cables and a draft head comprising groups of bell-crank levers pivoted on fixed centers in the draft-head having arms extending toward a common center, means for connecting such arms to cables, and means for connecting the other arms of the levers of both groups in such manner that the stresses of the several arms are balanced against each other and the stresses in the levers of one group oppose the stresses in the levers of the other group.

4. A draft head comprising parallel spaced pivot members fixed in the draft-head, a plurality of bell-crank levers having arms of different lengths extending horizontally toward the center from both pivot members, means for attaching a cable to each arm, and means for movably connecting the other arms of said bell-crank levers to cause an equal distribution of the load to the several cables.

5. In an elevator, in combination, a car, a counterweight, a plurality of parallel cables, connecting means between the several cables and the counterweight tending to equalize the strains on the several cables and tending also to maintain the cable ends even, and connecting means between the cables and the car tending to equalize the strains on the several cables, comprising members mounted on pivots fixed to the car and means connecting said members to cause the rotative effort acting on one member to oppose the rotative effort acting on another, substantially as and for the purpose described.

6. A draft head comprising fixed spaced pivot members, a plurality of levers on each pivot member having arms which extend toward a common center and are adapted to be connected to cables, and connections between said levers arranged to maintain equal the tensions of the several cables.

7. A draft head comprising two groups of levers having cable attaching arms, the cable attaching arms of one group extending toward the cable attaching arms of the other group, equalizing link and lever mechanism connecting the several levers of one group to a movable member to exert thereon a force in one direction, and equalizing link and lever mechanism connecting the several levers of the other group to said member, to exert thereon a force in the opposite direction.

8. Equalizing mechanism comprising levers mounted on fixed pivots having arms extending toward each other from opposite directions, their inner ends being adapted to be connected to draft cables and means connecting said levers with the load and with each other to support the load and to balance the pull on the levers one against the other.

9. In an equalizing device, in combination three levers of different lengths mounted on a fixed pivot and adapted to be connected to cables, and equalizing lever connections arranged to cause upward movement of one lever to produce such downward movement of one or both of the other levers, that the sum of the downward movements will be equal to the upward movement of the first lever.

10. A plurality of levers mounted on fixed pivots and extending toward each other from opposite directions and means equalizing the pull of the several levers and transmitting the total pull to a load substantially as described.

11. An equalizing device for draft rigging comprising a plurality of members pivoted at fixed points to the load, draft cables connected to and tending to rotate the members about said pivots, means connecting said members to each other to cause the rotative effort on one member to oppose that on another member to equalize the pull of the several draft cables.

12. A draft head comprising parallel pivot members supported in fixed spaced relation, a group of levers mounted on each pivot member having cable attaching arms of different lengths extending toward a common center, a floating member, connections between each group of levers and the floating member comprising links and levers arranged to transmit equal forces from each of the several levers of the group to the floating member.

13. In an elevator draft rigging, the combination with draft cables of equalizing mechanism comprising levers having horizontal arms connected to the cables and to a fixed pivot offset from the axis of the cables and horizontally disposed equalizing mechanism connecting said levers so constructed and arranged that the rotative effect of the pull of each cable upon its lever is balanced against the same effect of each and every other lever.

In testimony whereof, we have signed our names to this specification the 5th day of April, 1921, and the 2nd day of April, 1921, respectively.

CHARLES R. PRATT.
JOHN C. HESLIP.